June 21, 1938.  F. C. BEST  2,121,007
MOTOR VEHICLE
Filed June 29, 1934   2 Sheets-Sheet 1

Inventor
FRANK C. BEST.
By Milton Tibbetts
Attorney

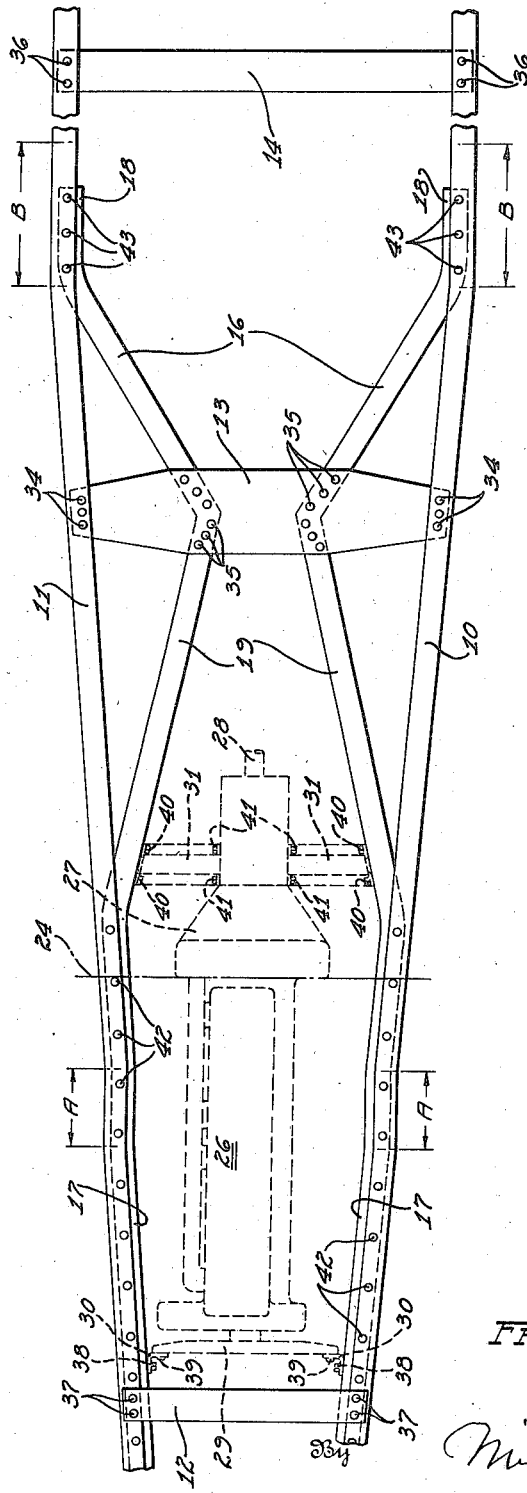

Patented June 21, 1938

2,121,007

UNITED STATES PATENT OFFICE 2,121,007

MOTOR VEHICLE

Frank C. Best, Detroit, Mich., assignor to Packard Motor Car Company, Detroit, Mich., a corporation of Michigan Application June 29, 1934, Serial No. 733,075

4 Claims. (Cl. 280—106)

This invention relates to frame structures and more particularly to frame structures for motor vehicles.

Frame structures of the type mentioned usually comprise a pair of longitudinally extending side sills and cross brace means extending intermediate the side sills, the sills being straight but arranged relatively so that they diverge from front to rear.

It is customary with most motor vehicle manufacturers to produce several models of similar general design but having motors and bodies of varying lengths. The frame lengths must vary with different motors and bodies but the same frame width at the front and rear is maintained in order that uniform axles, suspension and other elements associated with the chassis can be used with all models. Variance in frame lengths, with uniform front and rear widths, varies the distance between the diverging side sills along the length of the frames relatively. As a result, different cross brace means must be employed and a plurality of fixtures must be used in the fabrication of different length frame structures. The stocking of varying cross brace means and the use of a plurality of fixtures for different frame lengths increase the cost of frame structures as well as the overhead resulting from the space required for fabrication.

It is an object of this invention to provide a novel form of frame structure which can be fabricated in different lengths and still employ uniform cross brace means and substantially the same forming and assembly fixtures.

Another object of the invention is to provide a motor vehicle frame in which the side sills are formed with diverging portions and parallel portions in order that a uniform cross brace means can be employed therewith for different lengths of frame.

A further object of the invention is to provide a frame structure for motor vehicles which can be fabricated economically.

Still another object of the invention is to provide a frame design for motor vehicles in which the side sills are formed with diverging portions which will have the same angular relation irrespective of frame length.

Other objects of the invention will appear from the following description taken in connection with the drawings, which form a part of this specification, and in which:

Fig. 4 is an enlarged fragmentary plan view of the chassis shown in Fig. 2.

Figure 1:
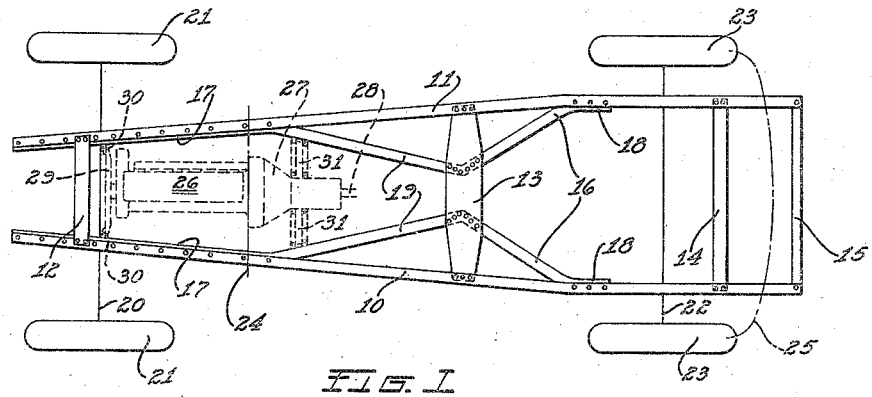
Fig. 1 is a plan view of a motor vehicle chassis showing a frame of basic formation.

In the fabrication of a line of motor vehicles having similar general characteristics, the frame structures must vary in size to accommodate engines and bodies of varying lengths. It is the purpose of this invention to provide a frame design which can be fabricated in different sizes while employing substantially uniform brace means and substantially the same fixtures. In order that the differences in frames of different sizes can be readily observed, I have shown in the drawings two chassis, one of which is for the smallest vehicle in the line and the other of which is for a larger vehicle in the line.

Referring to Fig. 1, the frame consists of side sills 10 and 11 secured in spaced relation by intermediate brace means consisting of transversely extending members 12, 13, 14, and 15 and longitudinally extending brace members 16. The side sills are each formed preferably of a single length of metal bent into channel form, the channels being arranged with their open portions facing. The longitudinally extending brace members are each preferably formed of a single length of metal bent into channel form and of such dimensions that the front and rear end portions 17 and 18 thereof will telescope within the adjacent side sills. The intermediate portions 19 of the longitudinally extending brace members extend inwardly of the frame at an angle and together form in effect an X-brace, as viewed in plan. Such intermediate brace means are secured to the side sills and to each other in a manner to be hereinafter described.

The forward end of the frame is suitably suspended above the front steering axle 20 and road steering wheels 21 are mounted on each end of the axle. The rear end of the frame is suitably suspended above the drive axle 22 and the traction road wheels 23 are carried at the ends of the rear axle structure. Mounted on the frame is a body, the dash portion of which is shown by the dotted line 24 and the rear end of which is shown by the dotted line 25.

A power plant unit consisting of an internal combustion engine 26 and a transmission unit 27 are carried at the forward end of the frame. Propeller shaft 28 extends rearwardly from the transmission and is arranged to drive the rear axle in the usual manner. The engine and the transmission casing are preferably formed as an integral structure, the forward end of the engine being carried by a supporting member 29 having its ends fixed to brackets 30 which are fixed to the forward portions 17 of the longitudinally extending brace members. Bracket members 31 extend inwardly from the forward ends of the angular portions of the longitudinally extending brace means and are connected to support the transmission casing.

Figure 2:
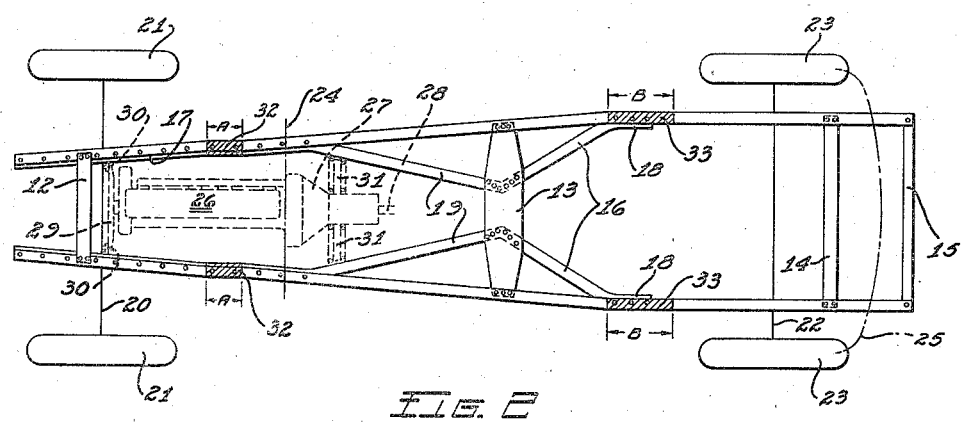
Fig. 2 is a plan view of another motor vehicle chassis showing a frame of greater length than that shown in Fig. 1 to accommodate a longer body and a longer motor.
Figure 3:
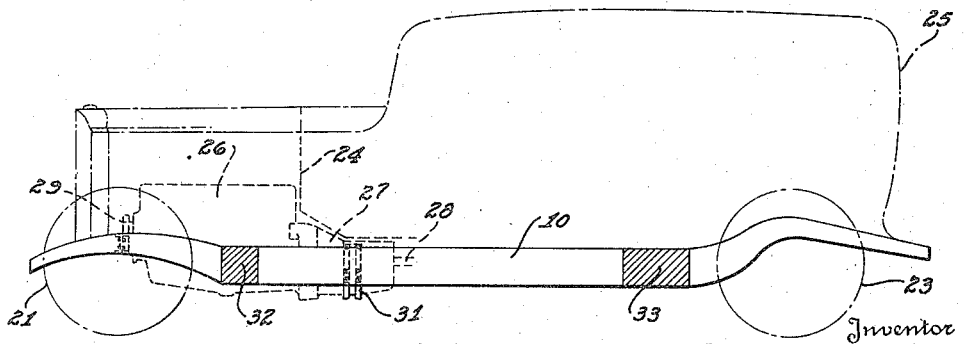
Fig. 3 is a side elevational view of the chassis shown in Fig. 2.

The side sills of the frame shown in Fig. 1 have their rear portions extending parallel with a longitudinal centerline through the chassis and the portions of the side sills forwardly of the parallel rear portions extend at similar angles and converge toward the front end. This frame structure is basic for the various sizes of frames required in a line of cars having similar characteristics. In Figs. 2 to 4 inclusive in the drawings, I have illustrated a chassis for a vehicle which has a longer engine and a longer body than that associated with the frame in Fig. 1. A comparison of such frames and engines can readily be made by referring to Figs. 1 and 2 of the drawings.

In order that substantially the same brace means and fixtures can be utilized in fabricating the frame shown in Figs. 2 to 4 inclusive as those used in fabricating the frame shown in Fig. 1, I have devised a design of frame which will maintain the basic width at points where the intermediate brace means is attached throughout the line of frames. When a longer engine is to be employed, the side sills and the longitudinally extending brace members are fabricated from longer pieces of stock and such additional length is commensurate with the additional length of the engine shown in Fig. 2, as compared with that shown in Fig. 1. This increased length is indicated at A in Figs. 2 to 4 and such portion of the side sills and associated longitudinally extending brace means are formed to extend parallel with the longitudinal centerline of the chassis. These parallel portions extend in the plane of the engine and may be said to be interposed in the converging portion of the side sills which otherwise are the same as those in Fig. 1. This increased length of side sill and longitudinally extending brace means is indicated by hatch lines 32 in Figs. 2 and 3. It will be seen that the width between the side rails forwardly of the portions 32 and rearwardly thereof will be the same as that in Fig. 1 and, as a consequence, uniform bracket means 30, engine support 29 and 31, and brace means 12, 13, 14, and 15 can be employed throughout the line of chassis irrespective of their length. The angular portions of the longitudinally extending brace means forming the X-brace will likewise remain the same because the distance between the co-extending sill portions has not been changed.

When a body longer than that shown in Fig. 1 is to be employed, then the side sills are formed with an extra length commensurate with the additional length of the body and this increased length is indicated at B in Fig. 2 and also shown by the hatch lines 33. Such additional length is added to the forward end of the rear parallel portions of the side sills and it is obvious that no increased frame width will thereby result. The length of the portions 32 and 33 is made according to the difference in the length of engine and body as compared with the frame shown in Fig. 1 which has been referred to as the basic frame and various lengths of frame can be fabricated without requiring any change in the intermediate brace means, with the exception of the length of the longitudinally extending brace members.

Substantially the same fixtures can be used in fabricating frames of different lengths having the design above outlined. The cross brace 13 is arranged so that its ends lie below the top flange of the side sills and rivets 34 extend through openings in such adjacent members to fix them rigidly together. The angular portions of the longitudinally extending brace means underlie the cross brace 13 and rivets 35 extend through holes in such openings and secure these elements rigidly together. The cross braces 14 and 15 also project beneath the top flange of the side sills and are secured thereto by rivets as indicated at 36 in Fig. 4. The forward cross brace 12, upon which the radiator (not shown) is seated, has end portions extending on top of the side rails which are secured by rivets 37. The brackets 30 are secured by bolts 38 to the portions 17 of the longitudinally extending brace means and the motor support 29 is fixed to the brackets by rivets 39. The brackets 31 are secured to the angular portions of the longitudinally extending brace members by bolts 40 and by bolts 41 to the transmission casing. The portions 17 of the longitudinally extending brace members telescope the side rails and are secured thereto by rivets 42 while the rear ends of the longitudinally extending brace members telescope the parallel portions of the side rails and are secured thereto by rivets 43. Since the cross brace means is similar for different lengths of frames, no variance in fixtures is thereby required in order to form such elements and assemble them with the side sills. The brackets 31 are in the same relation with the angular portions of the longitudinally extending brace members in all lengths of frames and consequently the same fixtures can be used for assembling these elements and the same is true of the brackets 30 and the motor support 29. Substantially the only difference in fixtures needed for fabricating the frames of different size occurs in bending of the forward portion of the side sills and the longitudinally extending brace means and bending of the rear portion of the side sills. In such bending operations, however, the same equipment used with the frame shown in Fig. 1 can be employed with an additional length inserted for the portions A and B. With the design of frame shown in Figs. 2 to 4 inclusive, I am able to fabricate different lengths of frame economically due to the uniformity of brace means and fixtures.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle having front and rear axle means, a frame comprising a pair of longitudinally extending spaced sills and brace means intermediate said sills, said sills between said pair of axle means having rearwardly diverging front end portions, parallel portions continuing rearwardly of said front diverging portions and rearwardly diverging portions extending rearwardly from the parallel portions.

2. In a motor vehicle having transversely extending front and rear axle means, a chassis frame comprising a pair of similar transversely spaced side sills having rearwardly diverging portions and parallel portions arranged alternately from front to rear intermediate the front and rear axle means, and brace means connecting said side sills together.

3. In a motor vehicle having transversely extending front and rear axle means, a chassis frame comprising a pair of spaced side sills having two rearwardly diverging portions and a parallel portion intermediate the diverging portions, said portions extending intermediate the front and rear axle means, the diverging portions of each sill forming a straight line if arranged in end to end relation, and brace means connecting the side sills together.

4. In a motor vehicle having transversely extending axle means, a chassis frame comprising a pair of similar spaced side sills, said sills between said axle means having two rearwardly diverging portions and a parallel portion intermediate the diverging portions, and brace means intermediate and fixed to said sills.

FRANK C. BEST.